Patented May 29, 1951

2,554,700

UNITED STATES PATENT OFFICE 2,554,700

CONTROLLED PARTIAL DECOMPOSITION OF CHLORINATED RUBBER

Malcolm E. Gross and Edwin B. Newton, Akron, Ohio, assignors to The B. F. Goodrich Company, New York, N. Y., a corporation of New York No Drawing. Application July 30, 1947, Serial No. 764,920

6 Claims. (Cl. 260—772)

This invention relates to controlling the partial dehydrochlorination of chlorinated rubber, and particularly to decomposition of a chlorinated rubber by heating in the presence of a catalyst.

It is an object of this invention to provide a method of reducing the chlorine content of a chlorinated rubber. It is a further object to carefully control the partial decomposition so that the resulting product will have a particular proportion of chlorine by weight and the physical properties of the rubber will not be changed to any appreciable extent. Other objects will be apparent from the description which follows.

These objects may be attained by adding a small amount of a catalyst to the chlorinated rubber and heating the mixture to expel hydrogen chloride in the form of a gas.

Normally, chlorinated rubber is commercially available with a chlorine content of about 66% chlorine by weight. It has been found that a chlorinated rubber with about 57% chlorine by weight is needed in the preparation of certain rubber adhesives. Since no chlorinated rubber with such a chlorine content is commercially available, it is necessary to decompose the commercially available chlorinated rubber. This partial decomposition presents a serious problem because accurately reproducible results are very difficult to attain.

Several methods of decomposition may be used; for example, gaseous ammonia may be passed into a solution of the chlorinated rubber for a sufficient time to remove a portion of the chlorine. Similar results can be obtained by heating the chlorinated rubber solution. It was discovered that the better method was to heat the solid chlorinated rubber for a sufficient time to cause the partial decomposition.

Although this latter method was determined to be the best method, the resulting amount of decomposition was found to be difficult to control. For instance, when a product having 57% chlorine is desired, even though a careful control of the heating time and amount of heat applied may be maintained, the resulting products may have from 55% to 60% chlorine by weight; and in addition to this variance of chlorine content, the physical properties may be changed, for instance, the product may become insoluble in aromatic solvents.

It has now been found that the addition of a small amount of a catalyst to a chlorinated rubber makes it possible to carefully control decomposition by heating. With the addition of certain catalysts to the chlorinated rubber and with subsequent heating, reproducible results may be attained in the reduction of the chlorine content of the rubber, notwithstanding the fact that the different lots of a single type of chlorinated rubber may vary in stability toward heat, and regardless of any foreign material that may be introduced accidentally in the heating process tending to catalyze decomposition to an unknown degree.

As an example of this controlled decomposition or dehydrochlorination of chlorinated rubber, the following standard recipes in parts by weight, may be used:

A

|  | Parts |
|---|---|
| Chlorinated natural rubber (66.5% chlorine) | 100 |
| Dibutyl phthalate | 10 |
| Iron oxide ($Fe_2O_3$) | 0.037 |

B

|  | Parts |
|---|---|
| Chlorinated natural rubber (66.5% chlorine) | 100 |
| Dibutyl phthalate | 10 |

Several samples of these two batches were heated separately on a rubber mill for a sufficient length of time to reduce the chlorine content of the rubber from 66.5% to about 57%. The temperature of the rubber was maintained between 250° and 270° F. Both A and B batches were milled carefully with special care being taken not to overheat the batch. The dibutyl phthalate was added to plasticize the chlorinated rubber to such an extent that a continuous sheet could be formed on the mill. The results were as follows:

A

|  | Percent chlorine |
|---|---|
| Run 1 | 57.1 |
| Run 2 | 57.0 |
| Run 3 | 57.2 |
| Run 4 | 57.0 |
| Run 5 | 57.2 |

B

|  | Percent chlorine |
|---|---|
| Run 1 | 59.3 |
| Run 2 | 59.4 |
| Run 3 | 59.6 |
| Run 4 | 57.4 |
| Run 5 | 57.7 |

The results under column A were obtained by heating portions of recipe A, which contained iron oxide as a catalyst for periods of about 18 to 22 minutes. All five runs using recipe A gave a product having within 0.2% of the desired chlorine content.

The results under column B were obtained by carefully heating portions of recipe B, which included no catalyst, for about 60 minutes. These products tended to be insoluble in aromatic solvents, and were unsatisfactory for this reason.

These five runs indicate that with an addition of a catalyst such as iron oxide, a specific reduction of chlorine content can be repeatedly obtained to within plus or minus 0.5% of chlorine. This control can be attributed to the reduction of time necessary for milling and also to the fact that any variation of purity of the batch being milled will be made insignficant by the addition of a known amount of a catalyst. Other oxides and metals which many times may be present on the mill because of insufficient cleaning or other reasons will cause varying degrees of catalysis, but when a known amount of catalyst, which is large in comparison to any impurities which may be introduced, is added, then predictable results can be repeatedly obtained.

Although a specific chlorinated rubber and catalyst have been used in the example, it has been found that any of the common chlorinated rubbers may be treated in a like manner, including besides chlorinated natural rubber, chlorinated polyisoprene, chlorinated neoprene (polychloroprene), chlorinated rubbery polymers and copolymers of butadiene-1,3 hydrocarbons, and the like.

Likewise, other basic polyvalent metal oxides and salts may be used as a catalyst in amounts from 0.01% to 0.1% by weight of the chlorinated rubber. In addition to ferric oxide, such catalysts as zinc oxide, zinc carbonate, ferrous oxide, and zinc borate may be added for the purpose of catalyzing the expulsion of chlorine in the form of hydrogen chloride gas.

It has been found that the preferred method of decomposing chlorinated rubber is to mill the rubber on heated rolls with the temperature of the rolls and length of time for milling carefully controlled. The expulsion of hydrogen chloride gas by this method must be catalyzed in order to obtain a definite amount of decomposition. Without a catalyst, no reproducible results can be obtained; for instance, the percentage of chlorine in the product may vary as much as 5% even with carefully controlled conditions. With a catalyst, the dechlorination can readily be carried to any extent desired and to within plus or minus 0.5% of the desired chlorine content. The temperature used to effect removal of hydrogen chloride may vary from about 200° to 280° F., but the preferred range is from 250° to 270° F. The time of heating may be varied over a wide range, depending upon the amount of chlorine it is desired to remove as well as upon the temperature employed.

If a catalyst is used, not only the time of heating is reduced, but also the temperature necessary for decomposition may be lowered. Thus, the danger of overheating the chlorinated rubber with resultant insolubility in aromatic solvents is eliminated.

Such a catalyst as ferric oxide or any of the other catalysts described above is inactive at room temperature so that the catalysts need not be removed after the desired decomposition has taken place. The catalysts disclosed in this invention will not be effective except at elevated temperatures; therefore, decomposition with loss of hydrogen chloride may be controlled closely by the application of the proper amount of heat to the chlorinated rubber.

This method of controlled decomposition yielding a chlorinated rubber having an exact percentage of chlorine makes it possible to obtain a product needed in the manufacture or compounding of certain commercial rubber-to-metal adhesives. Chlorinated rubber containing any desired proportion of chlorine may be prepared by the method described. The amount of chlorine remaining in the rubber will generally vary inversely with the length of time the rubber is heated at any given temperature.

While the invention has been described with reference to specific embodiments and examples, it is not our intention to be limited thereto, for variations and modifications of the invention are possible without departing from the spirit and scope of the claims.

We claim:

1. A method of reducing the chlorine content of a chlorinated rubber containing about 66.5% chlorine by weight, which comprises hot roll milling said rubber with from 0.01% to 0.037% by weight of an iron oxide to obtain a product having about 57% chlorine by weight.

2. A method of reducing the chlorine content of a fully chlorinated rubber, which method comprises heating said rubber at a temperature of 200° to 280° F. with from 0.01 to 0.1% by weight of an iron oxide dispersed therein to obtain a product having a predetermined chlorine content less than that of said fully chlorinated rubber.

3. A method of reducing the chlorine content of a fully chlorinated rubber, which method comprises masticating said rubber at a temperature of 250° to 270° F. with from 0.01 to 0.1% by weight of an iron oxide dispersed therein to obtain a product having a predetermined chlorine content less than that of said fully chlorinated rubber.

4. A method of reducing the chlorine content of a fully chlorinated natural rubber containing about 66.5% chlorine by weight, which method comprises masticating said rubber at a temperature of 250° to 270° F. with from 0.01 to 0.1% by weight of an iron oxide dispersed therein to obtain a product having a predetermined chlorine content less than that of said fully chlorinated rubber.

5. A method of reducing the chlorine content of a fully chlorinated natural rubber containing about 66.5% chlorine by weight, which method comprises masticating said rubber at a temperature of 250° to 270° F. with from 0.01 to 0.1% by weight of ferric oxide dispersed therein to obtain a product having a predetermined chlorine content less than that of said fully chlorinated rubber.

6. A method of reducing the chlorine content of a fully chlorinated natural rubber containing about 66.5% chlorine by weight, which method comprises masticating said rubber at a temperature of 250° to 270° F. with from 0.01 to 0.1% by weight of an iron oxide dispersed therein to obtain a product having about 57% chlorine by weight.

MALCOLM E. GROSS.
EDWIN B. NEWTON.

REFERENCES CITED

The following references are of record in the file of this patent:

UNITED STATES PATENTS

| Number | Name | Date |
|---|---|---|
| 1,695,641 | Ellis | Dec. 18, 1928 |
| 2,022,614 | Balle et al. | Nov. 26, 1935 |
| 2,345,507 | Smith | Mar. 28, 1944 |
| 2,376,027 | Bouchard | May 15, 1945 |